Feb. 16, 1932.                C. C. FARMER                1,845,492
                           FLUID PRESSURE BRAKE
                          Filed Feb. 6, 1931         2 Sheets-Sheet 1
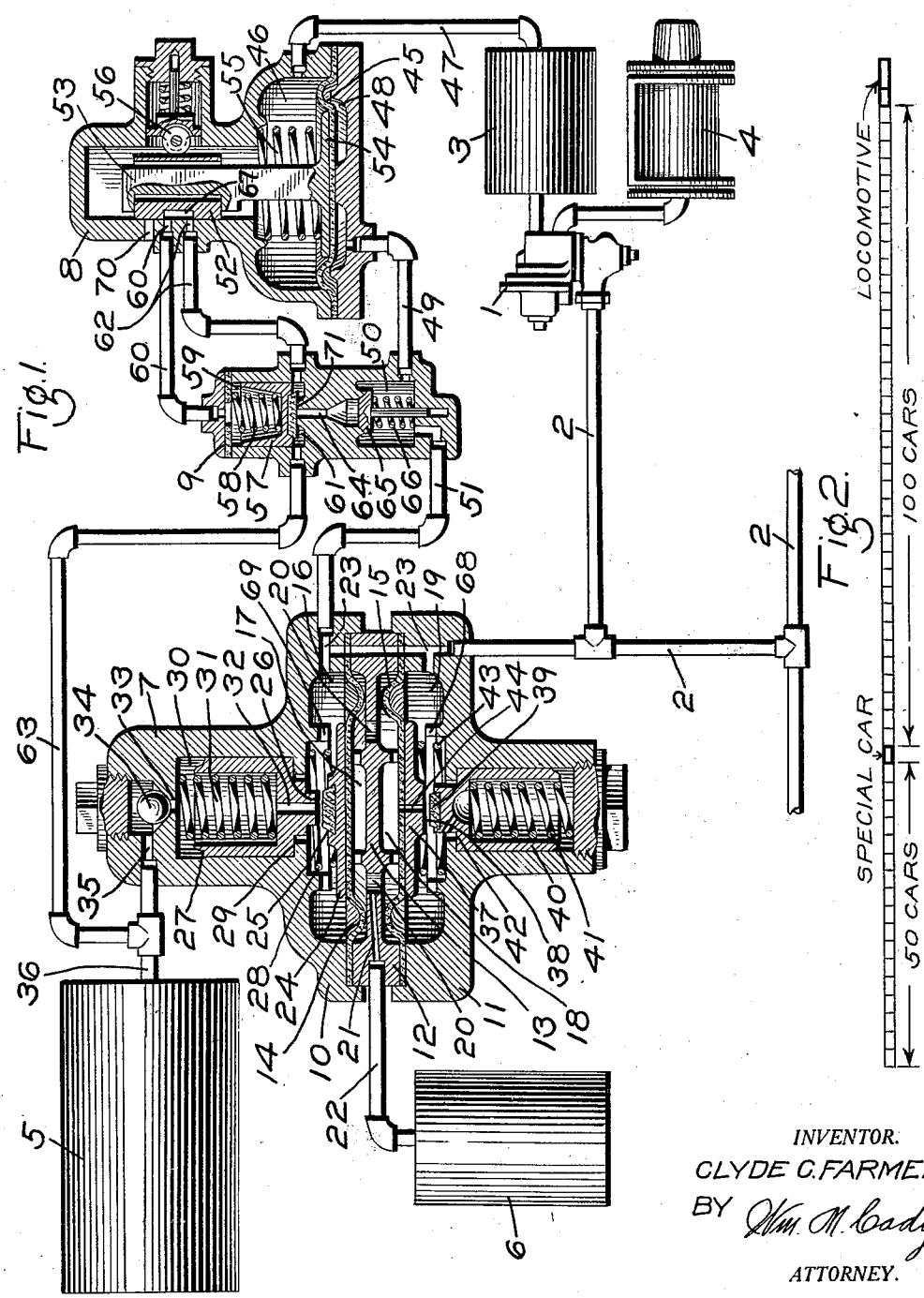
INVENTOR.
CLYDE C. FARMER
BY *Wm. M. Cady*
ATTORNEY.

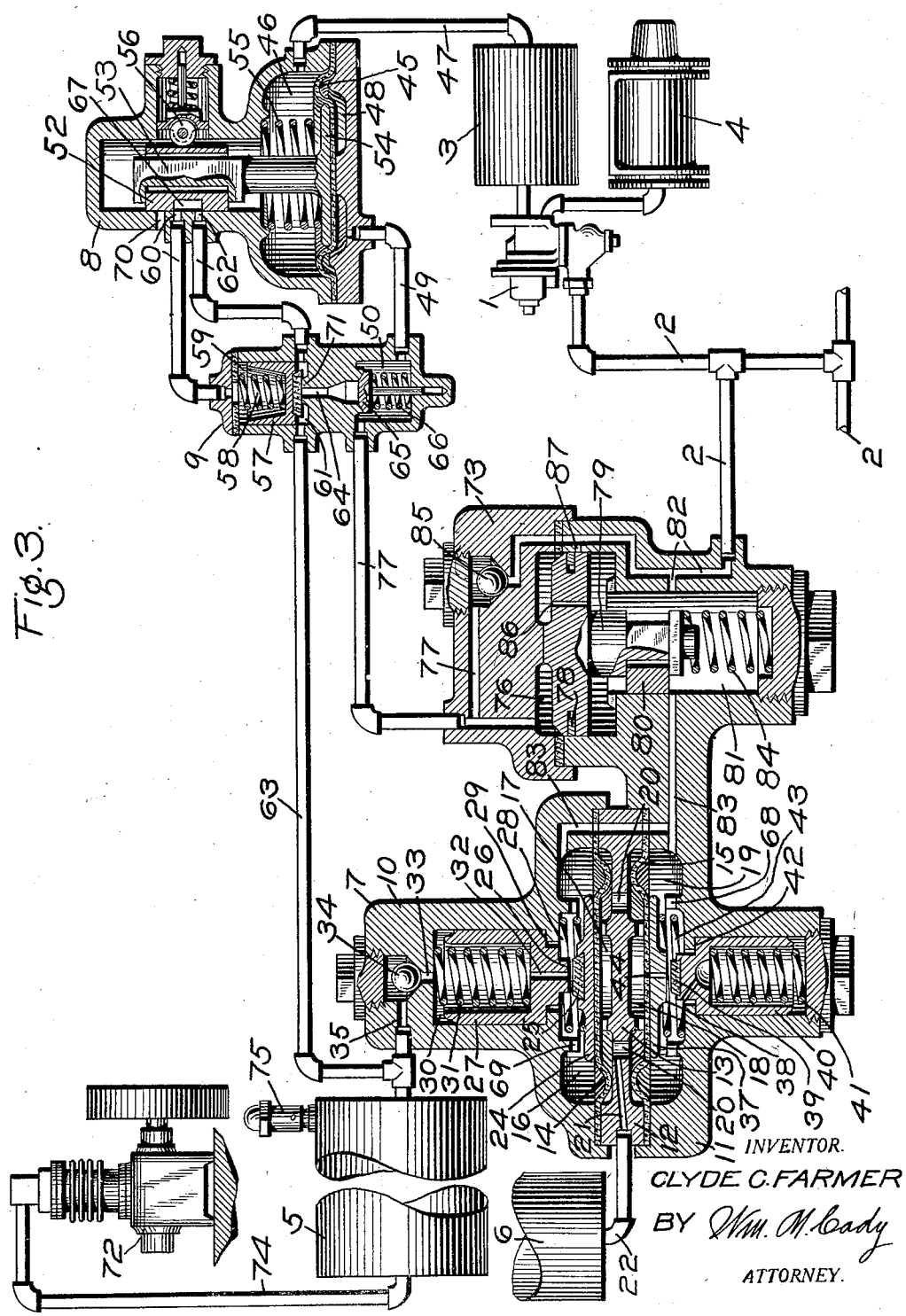

Patented Feb. 16, 1932

1,845,492

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 6, 1931. Serial No. 513,797.

This invention relates to fluid pressure brakes, and more particularly to a fluid pressure brake system for railway trains.

For the purpose of economy, there is a continuing tendency to increase the number of freight cars in a train and where heretofore a freight train might consist of 100 cars, there are now trains being operated which include up to 150 cars.

With the increase in the length of the train, the train brake pipe of the fluid pressure brake equipment is correspondingly increased in length and although the fluid pressure brake equipment has been improved from time to time so as to successfully handle longer and longer trains, the continued increase in the length of the train and the brake pipe correspondingly increases the operating difficulties in the control of the brakes.

One such difficulty arises from the increased length of time required to obtain approximately the full working pressure in the fluid pressure brake system on the rear cars of a very long train, it being necessary, with the present fluid pressure brake system, to supply the brake pipe with compressed fluid solely from the locomotive. The above condition results in a partial reduction in brake efficiency and also causes certain operating difficulties.

It might be possible to further improve the fluid pressure brake equipment employed on cars, so as to obviate the difficulties referred to, but this would necessitate equipping all cars in service with an improved fluid pressure brake equipment, which would involve great expense and which would require considerable time to install.

For the purpose of eliminating all of the above mentioned difficulties in the control of the brakes on a very long train, it has been proposed by Henry H. Westinghouse, in his application filed November 8, 1929, Serial No. 405,648, to equip a special vehicle or caboose of the train with apparatus by which a supply of fluid under pressure is generated and maintained on such special vehicle or caboose independently of the brake pipe and to provide means whereby the fluid under pressure stored on the caboose or special vehicle is supplied to the brake pipe at the desired time.

For the same purpose, I propose to equip the special vehicle or caboose with an apparatus by which the storage reservoir is supplied with fluid under pressure from the brake pipe and by which fluid under pressure so stored is supplied to the brake pipe at the desired time, and the principal object of my invention is to provide said apparatus with means whereby the charging of the storage reservoir is delayed until after the brake pipe pressure is increased to substantially that normally carried, that is, until after the brake pipe is substantially fully charged, thereby preventing an increase in the time required to fully charge the brake pipe, which means is adapted to operate to retard the rate of flow of fluid from the brake pipe to the reservoir when the flow to the reservoir tends to reduce brake pipe pressure.

Other objects and advantages will appear in the following more detailed description of the invention.

In the accompanying drawings; Fig. 1 is a diagrammatic view, partly in section, of a brake apparatus embodying my invention; Fig. 2 is a diagram illustrating the location of the special vehicle in a train of cars; and Fig. 3 is a diagrammatic view, partly in section, of a brake apparatus embodying a modification of the invention.

According to one form of my invention, as shown in Fig. 1 of the drawings, the brake equipment for the special car or caboose may comprise the usual triple valve device 1 which is connected in the usual manner to a brake pipe 2, an auxiliary reservoir 3 and a brake cylinder 4 and may further comprise a reservoir 5 of large capacity, a control chamber or reservoir 6, control valve devices 7 and 8 and a relay valve device 9.

The control valve device 7 is provided for controlling the supply of fluid under pressure from the brake pipe 2 to the reservoirs 5 and 6. This valve device comprises a casing having end sections 10 and 11 and an intermediate section 12 which is clamped between the end sections 10 and 11. The intermediate section is provided with a web 13 adapted to separate flexible diaphragms 14 and 15 which are contained in the casing, the diaphragm 14 being clamped between the end casing section 10 and one side of the intermediate section 12 and the diaphragm 15 being clamped between the end casing section 11 and the other side of the section 12.

At one side of the diaphragm 14 there is a chamber 16 and at the other side a chamber 17 and at one side of the diaphragm there is a chamber 18 and at the other side a chamber 19. The chambers 17 and 18 are constantly connected together through a plurality of ports 20 in the web 13 of the intermediate casing section 12 and are both connected to the control reservoir 6 through one of the ports 20, a passage 21 in the intermediate casing section and a pipe 22. The chambers 16 and 19 are connected to each other and to the brake pipe 2 through a passage 23.

Contained in the chamber 16 and carried by the flexible diaphragm 14 is a circular member 24 in which is mounted a valve 25 adapted to engage the seat 26 of a valve seat member 27 which is slidably mounted in the casing section 10. Also contained in the chamber 16 is a spring 28 which is interposed between the member 24 and the casing and which tends to maintain the valve 25 unseated as shown in the drawings.

The valve seat member 27 is provided with an annular shoulder 29 which is adapted to engage a corresponding shoulder on the casing section 10 when the valve 25 is unseated to limit the movement of the member in a direction toward the valve. Contained in a chamber 30 at one side of the valve seat member and interposed between the member and the casing section 10 is a spring 31, the pressure of which tends to move the member toward the valve 25 until the member is brought to a stop by the shoulder 29 engaging the corresponding shoulder on the casing section.

The valve seat member 27 is provided with a passage 32 which leads from the valve seat 26 to the chamber 30 and the diaphragm chamber 16 is connected to the chamber 30 through this passage when the valve 25 is unseated. The chamber 30 is connected to the reservoir 5 through a passage 33, past a ball check valve 34 mounted in the casing section, through a passage 35 and a pipe 36, said check valve being adapted to prevent back flow of fluid from the reservoir 5 to the chamber 30 as will hereinafter appear.

Contained in the diaphragm chamber 19 and carried by the flexible diaphragm 15 is a circular plate 37 having a valve seat 38 which is adapted to engage a valve 39 mounted on a valve member 40 slidably mounted in the casing section 11, said valve seat member being constantly subject to the pressure of a spring 41. The valve member 40 is provided with an annular shoulder 42 which is adapted to engage a corresponding shoulder on the casing section 11 to limit the travel of the valve member in the direction toward the valve seat 38. Also contained in the diaphragm chamber 19 is a spring 43 which is interposed between the member 37 and the casing section 11, the pressure of the spring tending to maintain the diaphragm 15 in such position that the valve seat 38 is out of engagement with the valve 39.

With the valve seat 38 out of engagement with the valve 39, the chamber 19 is connected to the chamber 18 and consequently to the chamber 17 and control reservoir through a passage 44 in the member 37 and diaphragm 15, said passage leading from the valve seat 38 to the chamber 19.

The control valve device 8 is provided for regulating the supply of fluid under pressure from the reservoir 5 to the brake pipe, and may comprise a casing containing a flexible diaphragm 45. A chamber 46 at one side of the diaphragm 45 is connected by a pipe 47 to the auxiliary reservoir 3 and a chamber 48 at the other side of the diaphragm is connected to the brake pipe 2 through a pipe 49, a valve chamber 50 in the casing of the relay valve device 9, a pipe 51 and passage 23 in the casing of the control valve device 7.

A slide valve 52 is mounted in chamber 46 and is operated by a stem 53, having a follower plate 54, adapted to engage the diaphragm 45. Contained in the chamber 46 and interposed between a wall of the valve casing is a spring 55 which, through the medium of the follower plate 54, urges the diaphragm 45 toward one end of the casing as shown. The slide valve 52 is held in close sliding engagement with its seat by a spring-pressed roller 56 which is in engagement with the back of the slide valve.

The valve device 8 controls the operation of a relay valve piston 57 which is mounted in the casing of the relay valve device 9 and is subject on one side to the pressure of a spring 58, which spring is contained in a chamber 59 connected to a pipe 60 leading to the seat of the slide valve 52. At the opposite side of the valve piston there is a chamber 61 which is connected to a pipe 62 leading to the seat of the slide valve and is also connected to the reservoir 5 through pipes 63 and 36.

The valve piston 57 of the relay valve device controls communication from the chamber 61 to a passage 64 and a check valve 65, which is subject to the pressure of a spring 66, controls communication from passage 35 to the check valve chamber 50.

The special vehicle or caboose equipped with the above described apparatus is placed in the train, preferably at an intermediate point, such for example, as illustrated in Fig.

2, representing a one hundred and fifty car train, the special vehicle or caboose being located fifty cars from the rear end of the train. It will also be understood that in some cases the special vehicle or caboose may be the rear end unit of the train.

In initially charging the equipment, fluid under pressure supplied to the brake pipe 2 flows through the triple valve device 1 to the auxiliary reservoir 3 in the usual well known manner and from the auxiliary reservoir fluid under pressure flows through the pipe 47 to the chamber 46 in the valve device 8. From the brake pipe, fluid under pressure also flows through passage 23 to the diaphragm chambers 16 and 19 in the valve device 7 and from the passage 23 fluid flows to the chamber 48 in the valve device 8 through pipe 51, check valve chamber 50 in the relay valve device 9 and pipe 49. The pressure of fluid supplied to the chambers 46 and 48 in the valve device 8 being substantially equal, the pressure of the spring 55 maintains the several movable parts of the device in their lowermost positions, as shown in Fig. 1.

Fluid under pressure supplied to the chamber 16 in the valve device 7 flows to the storage reservoir 5 through passage 32 in the valve seat member 27, chamber 30, passage 33, past the ball check valve 34, through passage 35 and pipe 36. From the pipe 36 fluid under pressure is supplied to the chamber 59 at the spring side of the valve piston 57 of the relay valve device through a pipe 63, chamber 61 in the relay valve device 9, pipe 62, a cavity 67 in the slide valve 52 of the valve device 8 and pipe 60. With fluid on opposite sides of the valve piston 57 substantially equal, the pressure of the spring 58 maintains it seated, thus closing communication from the chamber 61 to the passage 64.

Fluid under pressure supplied to the chamber 19 in the valve device 7 flows through the passage 44 in the member 37 and diaphragm 15 to the chamber 37 and from thence through the ports 20 to the chamber 17. Fluid under pressure also flows through the passage 21 and pipe 22 to the control reservoir 6.

With the equipment thus fully charged, the pressures of fluid on both sides of each of the diaphragms, 14 and 15 will be substantially equal and the pressures of the springs 28 and 43 will maintain the diaphragms 14 and 15 respectively, flexed inwardly as shown in Fig. 1. With the diaphragm 15 flexed inwardly, communication from the chamber 16 and consequently from the brake pipe 2 to the storage reservoir 5 and to the chambers 59 and 61 at opposite sides of the relay valve piston 57 is maintained open, and with the diaphragm 15 flexed inwardly, communication from the chamber 19 and consequently from the brake pipe 2 to the chambers 18 and 17 and to the control reservoir 6 is maintained open.

When the brake pipe pressure is reduced to effect an application of the brakes, the auxiliary reservoir pressure is equally reduced in the usual well known manner, so that the opposing fluid pressures of the brake pipe and auxiliary reservoir on the flexible diaphragm 45 of the valve device 8 remain substantially balanced and consequently the spring 55 acts to maintain the slide valve 52 in the position shown in Fig. 1.

Further, when the brake pipe pressure is thus reduced, the pressures of fluid in the diaphragm chambers 16 and 19 in the valve device 7 are correspondingly reduced. The rate of reduction in the pressure of fluid in the chamber 19 is faster than the rate at which the pressure of fluid in the control reservoir and diaphragm chambers 17 and 18 can reduce through the passage 44 in the valve seat member 37 and diaphragm 15 and as a consequence, the control reservoir pressure in chamber 18 causes the diaphragm 15 to flex outwardly against the opposing pressure of the spring 43, causing the valve seat 38 to engage and seal against the valve 44, thus closing off this flow of fluid from the chamber 18 to the chamber 19.

It will here be understood that upon initiating a service reduction in brake pipe pressure, the valve seat 38 is quickly moved into sealing engagement with the valve 39, so that the loss of control reservoir pressure by way of the passage 44 is negligible.

After the valve seat 38 is in engagement with the valve 44, the outward pressure of the diaphragm 15, which is transmitted to the valve 44 through the medium of the valve seat member 37, causes the valve member 40 to be depressed against the opposing pressure of the spring 41 until such time as the outward flexing of the diaphragm is stopped by the valve seat member engaging stops 68 on the casing section 11. By providing the yieldable valve member 40, and the stops 68 for limiting the outward movement of the valve seat member 37, the pressure of the valve 44 on the seat 38 is limited to the pressure of the slightly compressed spring 41 acting through the medium of the valve member 40, consequently the valve cannot be subjected to excessive pressure which might tend to damage the valve.

Upon the reduction in the pressure of fluid in the diaphragm chamber 16, control reservoir pressure in diaphragm chamber 17 causes the diaphragm 14 to flex outwardly seating the valve 25 carried thereby on the valve seat 26 of the valve seat member 27, thus closing communication from the chamber 16 to the chamber 30, the valve seat member having a substantially air tight sliding fit with the casing section 10.

After the valve 25 is in engagement with the valve seat 26 of the valve seat member 27, the outward pressure of the diaphragm 14, which is transmitted to the valve seat 26 through the medium of the valve 25, causes the valve seat member to be depressed against the opposing pressure of the spring 31 until such time as the outward flexing of the diaphragm is stopped by the valve member 24 engaging stops 69 on the casing section 10. It will thus be seen that the pressure of the seat on the valve will be limited to the pressure exerted by the slightly compressed spring 31 and that the valve cannot be subjected to excessive pressure.

To effect the release of the brakes, the brake pipe pressure is increased in the usual well known manner. As soon as the brake pipe pressure present in diaphragm chamber 48 in the valve device 8 is slightly higher than the reduced auxiliary reservoir pressure present in the chamber 46, say one and one-half pounds, or sufficient to overcome the pressure of the spring 55, the flexible diaphragm 45 is flexed upwardly, causing the slide valve 52 to be shifted to a position in which the pipe and passage 62 leading from the chamber 61 in the relay valve device is lapped and the pipe and passage 60 leading from the chamber 59 in the relay valve device is connected, through cavity 67 with an atmospheric port 70, thus venting fluid under pressure from the chamber 59. With the chamber 59 thus vented, fluid under pressure in chamber 61 operates to lift the valve piston 57 from its seat rib 71, thus opening communication from chamber 61 and consequently the storage reservoir 5 to passage 64.

Fluid under pressure from the reservoir 5 then flows from the chamber 61 and passage 64, past the check valve 65, thus quickly supplying additional fluid under pressure to the brake pipe at a point remote from the locomotive. The rate of brake pipe pressure on cars at the rear of the train is thus accelerated, with the result that the triple valve devices on the cars at the rear of the train are caused to move earlier than usual to release positions.

Now when the auxiliary reservoir pressure has been increased to substantially brake pipe pressure, the diaphragm 45 of the valve device 8 is returned to the position shown in Fig. 1 by the pressure of the spring 55, and the slide valve 52 is consequently shifted so as to again lap the atmospheric port 70 and connect the passages and pipes 60 and 62. Fluid pressure on opposite sides of the relay valve piston 57 then quickly equalizes, permitting the spring 58 to shift the valve piston 57 to its seat rib 71, thus cutting off the further flow of fluid under pressure from the storage reservoir 5 to the brake pipe 2.

When the brake pipe pressure present in diaphragm chambers 16 and 19 in the valve device 7 becomes substantially equal to the control reservoir pressure present in chambers 17 and 18, the diaphragms 14 and 15 will be flexed inwardly to the positions as shown in Fig. 1 by the springs 28 and 43 respectively. With the diaphragm 16 thus flexed, the valve 25 carried thereby is out of engagement with the seat 26 of the seat member 27 and fluid under pressure again flows from the chamber 16 to the storage reservoir 5 and to the chambers 59 and 61 of the relay valve device by way of the passage 32 in the valve seat member, chamber 30, passage 33, past the ball check valve 34, passage 35 and pipe 36, thus recharging the storage reservoir. If the flow of fluid through the passage 32 should be at such a rate as to tend to reduce brake pipe pressure, the diaphragm will be flexed upwardly by control reservoir pressure and the valve 25 carried by the diaphragm will be moved close to the seat 26 and restrict the flow of fluid to the reservoir 6, thus effectively preventing an unintentional reduction in brake pipe pressure.

With the diaphragm 15 flexed inwardly, the seat 38 of the seat member 37 carried by the diaphragm is free of the valve 39 and communication is again established between the diaphragm chamber 19 and the control reservoir 6 by way of the passage 44.

In Fig. 3 a modification of the invention is illustrated in which the pressure of fluid in the storage reservoir 5 may be increased beyond that normally carried in the brake pipe so as to provide a more rapid recharge of the brake pipe in releasing the brakes than is possible where the storage reservoir is charged to the normal brake pipe pressure.

The equipment shown in Fig. 3 includes all of the devices shown in Fig. 1 and in both of these figures like reference characters refer to like parts.

In addition, the equipment shown in Fig. 3 includes a fluid compressor 72 and a valve device 73.

The fluid compressor 72 may be of any suitable design and is installed on the caboose or special vehicle and may be belt driven from one of the axles (not shown) of the vehicle or if desired, may be driven by electrical means such as is disclosed in the application of Henry H. Westinghouse, filed November 8, 1929, Serial No. 405,648.

The compressor operates to compress fluid into the storage reservoir 5 through a pipe 74. The storage reservoir is provided with a safety valve 75 to relieve the pressure in the reservoir, if for any reason, the pressure should exceed a safe degree.

The valve device 73 is provided for the purpose of preventing an overcharge of the control reservoir 6 when, in releasing the brakes, communication is established from the storage reservoir 5 to the brake pipe.

This valve device 73 may comprise a casing having a chamber 76 connected to the check valve chamber 50 of the relay valve device 9 through a passage and pipe 77 and contains a piston 78 having a stem 79 adapted to operate a slide valve 80 contained in a chamber 81 which is constantly connected to the brake pipe 2 through a passage 82, and which, when the piston 78 and slide valve 80 are in their uppermost or normal positions, as shown in Fig. 3, is connected to the diaphragm chambers 16 and 19 in the valve device 7 through a passage 83. Also contained in the chamber 81 is a spring 84, the pressure of which, acting through the stem 79, tends to maintain the piston 78 and slide valve 80 in their uppermost positions.

In initially charging the equipment, shown in Fig. 3, fluid under pressure supplied to the brake pipe 2 flows to the chamber 81 in the valve device 73 through passage 82. From the passage 82, fluid under pressure flows past a ball check valve 85 mounted in the casing of the valve device 73 and through passage 77 to the piston chamber 76 and also to the diaphragm chamber 48 in the valve device 8. Since the chambers 84 and 76 of the valve device 73 are connected together, the fluid pressures on opposite sides of the piston 78 are maintained equalized and as a consequence, the spring 84 acts to hold the piston and slide valve 80 in their uppermost positions in which the slide valve uncovers the passage 83, permitting fluid under pressure from the chamber 81 to flow through this passage to the diaphragm chambers 16 and 19 of the valve device 7.

The charging of the remainder of the equipment is the same as described in connection with the equipment shown in Fig. 1. It will be noted that with the equipment thus charged, the storage reservoir 5 is charged to brake pipe pressure.

Now when the train is set in motion, the compressor 72 is operated and compresses fluid into the reservoir 5, thus increasing the storage reservoir pressure beyond that of the brake pipe, back flow of fluid from the reservoir to the chamber 30 being prevented by the ball check valve 34. Fluid at this higher pressure flows to the opposite sides of the valve piston 57 of the relay valve device 9 and due to this, the valve piston 57 will not move from its seated position.

When the brake pipe pressure is reduced to effect an application of the brakes, the valve device 7 will function in the same manner as before described in connection with the equipment shown in Fig. 1, to close off communication from the chamber 16 to the storage reservoir, and to close communication from the chamber 19 to the control reservoir. Further, when the brake pipe pressure is thus reduced, fluid under pressure in the piston chamber 76 in the valve device 73 flows to the valve chamber 81 through a small port 86 in the piston 78. The volumes of the chamber 76 and the connected chambers 50 and 48 in the relay valve device 9 and valve device 8 respectively, are very small and therefore sufficient pressure differential is not created on the piston 78 to cause it to move downwardly against the pressure of the spring 84, thus the slide valve 80 is maintained in position to permit the pressures of fluid in the diaphragm chambers 16 and 19 in the valve device 7 to reduce with the brake pipe.

To effect the release of the brakes, the brake pipe pressure is increased in the usual well known manner, causing the valve device 8 and relay valve device 9 to operate in the same manner as before described in connection with the equipment shown in Fig. 1, to establish communication from the storage reservoir 5 to the chamber 50 of the relay valve device.

With this communication established, fluid under pressure flows from the storage reservoir to the piston chamber 76 of the valve device 73, causing the piston 78 to move downwardly against the pressure of the spring 84. In its downward movement the piston first causes the slide valve to be shifted to a position in which communication is closed off from the chamber 81 to the passage 83 leading to the diaphragm chambers 16 and 19 in the valve device 7 and then uncovers a port 87 leading from the piston chamber 76 to the passage 82 leading to the chamber 81 and brake pipe 2. Fluid under pressure now flows from the chamber 76 to the brake pipe 2, thus the rate of brake pipe pressure increase, on the cars at the rear end of the train, is accelerated, with the result that the triple valves on the cars at the rear of the train are caused to move more promptly to release position than would be the case if no additional fluid pressure were provided. From the chamber 76, fluid under pressure also flows to the chamber 81 by way of the port 86 in the piston 78.

The port 87 is preferably choked slightly to prevent the equalization of the fluid pressures on opposite sides of the piston 78 immediately upon the piston uncovering the port, so that the piston and slide valve will be maintained in their lowermost positions against the opposing pressure of the spring 84 until the flow of fluid under pressure from the storage reservoir 5 to the brake pipe 2 ceases, at which time, the pressures on opposite sides of the piston 78 will be permitted to equalize through the port 86 in the piston. Upon such equalization being effected, the pressure of the spring causes the piston 78 and thereby the slide valve 80 to move to their uppermost positions as shown in Fig. 3. With the slide valve in this position, communication is again established from the brake pipe to the diaphragm chambers 16 and 19 of the valve device 7. When this communication is thus reestablished, the control reservoir pressure maintains the flexible diaphragms 14 and 15 flexed outwardly, so that communication from the chambers 16 and 19 to the storage reservoir 5 and control reservoir 6 respectively, are maintained closed.

It will here be noted that so long as fluid under pressure is flowing from the storage reservoir 5 to the brake pipe 2, the slide valve 80 is maintained in its lowermost position in which communication from the brake pipe 2 to the chambers 16 and 19 in the valve device 7 is closed, so that if, by the supply of fluid under pressure from the storage reservoir 5, the brake pipe pressure is temporarily increased locally beyond that normally carried in the brake pipe when the brake pipe is fully charged, no increase in control reservoir can be effected, thus insuring the proper operation of the valve device in effecting the partial recharge of the storage reservoir from the brake pipe 2. In this connection, it will be seen that if the valve device 73 were omitted, the control reservoir could be overcharged and if this should occur, then when the brake pipe pressure should reduce due to the flow of fluid to the rear cars of the train, the diaphragm 15 would operate to prevent the discharge of fluid from the overcharged control reservoir and the diaphragm 14 would operate to maintain communication closed from the brake pipe to the storage reservoir 5, and thus prevent the partial recharge of the reservoir 5 from the brake pipe.

Now when the auxiliary reservoir pressure has been increased to substantially brake pipe pressure, the valve devices 8 and 9 are caused to operate in the same manner as described in connection with the apparatus shown in Fig. 1 to close communication from the storage reservoir 5 to the brake pipe 2.

When the brake pipe is charged to substantially its normal maximum pressure, the valve device 7 operates in the same manner as described in connection with the apparatus shown in Fig. 1 to establish communication through which fluid under pressure flows from the brake pipe to the storage reservoir 5 and to also establish communication between the brake pipe and the control reservoir 6. It will thus be seen that in releasing the brakes, the storage reservoir 5 is charged with fluid under pressure from the brake pipe and to a pressure substantially equal to brake pipe pressure.

When, however, the train is set in motion the compressor will operate to increase the pressure of fluid in the storage reservoir as before described.

While the employment of one special vehicle or caboose has been described and shown in Fig. 2 of the drawings, two or more may be employed in the same train and is intended to be within the scope of the invention.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. The combination with a plurality of fluid pressure brake equipments on cars of a train including a brake pipe, of an apparatus on a designated car of the train comprising a fluid pressure supply source charged with fluid under pressure, means operated upon an increase in brake pipe pressure in releasing the brakes for supplying fluid under pressure from said source to said brake pipe, and means operable only after said brake pipe is substantially fully charged with fluid under pressure for supplying fluid under pressure from said brake pipe to said source.

2. The combination with a plurality of fluid pressure brake equipments on cars of a train including a brake pipe, of an apparatus on a designated car of the train comprising a fluid pressure supply source charged with fluid under pressure, means operated upon an increase in brake pipe pressure in releasing the brakes for suppling fluid under pressure from said source to said brake pipe, and means operable only after said brake pipe is substantially fully charged with fluid under pressure for supplying fluid under pressure from said brake pipe to said source and for regulating the rate of flow of fluid to said source.

3. The combination with a plurality of fluid pressure brake equipments on cars of a train including a brake pipe, of an apparatus on a designated car of the train comprising a fluid pressure supply source charged with fluid under pressure, means operated upon an increase in brake pipe pressure in releasing the brakes for supplying fluid under pressure from said source to said brake pipe, means operable only after said brake pipe is substantially fully charged with fluid under pressure for supplying fluid under pressure from said brake pipe to said source, and means operable to prevent back flow of fluid from said reservoir to said brake pipe.

4. The combination with a plurality of fluid pressure brake equipments on cars of a train including a brake pipe, of an apparatus on a designated car of the train comprising a fluid pressure supply source charged with fluid under pressure, means operated upon an increase in brake pipe pressure in releasing the brakes for supplying fluid under pressure from said source to said brake pipe, means operable only after said brake pipe is substantially fully charged with fluid under pressure for supplying fluid under pressure from said brake pipe to said source, and a ball check valve for preventing back flow of fluid from said reservoir to said brake pipe.

5. In a fluid pressure train brake system, the combination with a train brake pipe, of a reservoir carried on a car of the train, means for charging said reservoir with fluid under pressure from said brake pipe only after said brake pipe is substantially fully charged with fluid under pressure, and means operated upon an increase in brake pipe pressure in releasing the brakes for supplying fluid under pressure from said reservoir to said brake pipe.

6. In a fluid pressure train brake system, the combination with a train brake pipe, of a reservoir carried on a car of the train, means for charging said reservoir with fluid under pressure from said brake pipe only after said brake pipe is substantially fully charged with fluid under pressure and for automatically controlling the rate of flow of fluid to said reservoir to counteract any tendency of the brake pipe pressure to reduce due to the flow of fluid to said reservoir, and means operated upon an increase in brake pipe pressure in releasing the brakes for supplying fluid under pressure from said reservoir to said brake pipe.

7. In a fluid pressure train brake system, the combination with a train brake pipe, of a reservoir carried on a car of the train, means for charging said reservoir with fluid under pressure from said brake pipe only after said brake pipe is substantially fully charged with fluid under pressure, means for supplying additional fluid under pressure to said reservoir independently of said brake pipe, and means operated upon an increase in brake pipe pressure in releasing the brakes for supplying fluid under pressure from said reservoir to the brake pipe.

8. In a fluid pressure train brake system, the combination with a train brake pipe, of a reservoir carried on a car of the train, means for charging said reservoir with fluid under pressure from said brake pipe only after said brake pipe is substantially fully charged with fluid under pressure, means for supplying additional fluid under pressure to said reservoir independently of said brake pipe, means preventing back flow of fluid from said reservoir to the brake pipe, and means operated upon an increase in brake pipe pressure in releasing the brakes for supplying fluid under pressure from said reservoir to the brake pipe.

9. In a fluid pressure train brake system, the combination with a train brake pipe, of a reservoir carried on a car of the train, means for charging said reservoir with fluid under pressure from said brake pipe only after said brake pipe is substantially fully charged with fluid under pressure, means operated by the running of the car for supplying fluid under pressure to said reservoir in addition to that supplied from the brake pipe, and means operated upon an increase in brake pipe pressure in releasing the brakes for supplying fluid under pressure from said reservoir to the brake pipe.

10. The combination with a plurality of fluid pressure brake equipments on cars of a train including a brake pipe, of an apparatus on a designated car of the train comprising a fluid supply source charged with fluid under pressure, means operated upon an increase in brake pipe pressure in releasing the brakes for supplying fluid under pressure from said source to said brake pipe, means operable only after said brake pipe is substantially fully charged with fluid under pressure for supplying fluid under pressure from said brake pipe to said source, and means for supplying additional fluid under pressure to said source.

11. The combination with a plurality of fluid pressure brake equipments on cars of a train including a brake pipe, of an apparatus on a designated car of the train comprising a fluid pressure supply source charged with fluid under pressure, means operated upon an increase in brake pipe pressure in releasing the brakes for supplying fluid under pressure from said source to said brake pipe, means operable only after said brake pipe is substantially fully charged with fluid under pressure for supplying fluid under pressure from said brake pipe to said source, and means operated by the momentum of said designated car for compressing additional fluid into said reservoir.

12. A fluid pressure brake system for a train of cars comprising a train brake pipe, a fluid pressure brake apparatus on each car of the train operable upon a reduction in brake pipe pressure for effecting an application of the brakes and operable upon an increase in brake pipe pressure for effecting the release of the brakes, and additional apparatus on one car of the train comprising a reservoir, means operable only after said brake pipe is substantially fully charged with fluid under pressure for supplying fluid under pressure from the brake pipe to the reservoir, and operable upon a reduction in brake pipe pressure in effecting an application of the brakes to close communication from said brake pipe to said reservoir, and means operable upon an increase in brake pipe pressure in effecting the release of the brakes to supply fluid under pressure from said reservoir to said brake pipe.

13. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, means operated upon an increase in brake pipe pressure in releasing the brakes for supplying fluid under pressure from said storage reservoir to said brake pipe, and means subject to the opposing pressures of said control reservoir and brake pipe for supplying fluid under pressure from said brake pipe to said storage reservoir.

14. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, means operated upon an increase in brake pipe pressure in releasing the brakes for supplying fluid under pressure from said storage reservoir to said brake pipe, and means subject to the opposing pressures of said control reservoir and brake pipe for supplying fluid under pressure from said brake pipe to said storage reservoir and for regulating the rate of flow of fluid from the brake pipe to the storage reservoir.

15. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, means operated upon an increase in brake pipe pressure in releasing the brakes for supplying fluid under pressure from said storage reservoir to said brake pipe, and means subject to the opposing pressures of said control reservoir and brake pipe for supplying fluid under pressure from said brake pipe to said storage reservoir and for supplying fluid under pressure from the brake pipe to said control reservoir.

16. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, means operated upon an increase in brake pipe pressure in releasing the brakes for supplying fluid under pressure from said storage reservoir to said brake pipe, and means subject to the opposing pressures of said control reservoir and brake pipe for supplying fluid under pressure from said brake pipe to said storage reservoir, and means operated by fluid under pressure supplied from said storage reservoir for closing communication from said brake pipe to said control reservoir to prevent the control reservoir from being charged in excess of the normal brake pipe pressure by the pressure of fluid supplied from the storage reservoir to the brake pipe.

17. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, means operated upon an increase in brake pipe pressure in releasing the brakes for supplying fluid under pressure from said storage reservoir to said brake pipe, and means subject to the opposing pressures of said control reservoir and brake pipe for supplying fluid under pressure from said brake pipe to said storage reservoir, and means operated by fluid under pressure supplied from said storage reservoir for closing communication from said brake pipe to said control reservoir until the pressures of the storage reservoir and brake pipe equalize.

18. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure or effecting the release of the brakes, and an additional apparatus on one car of the train for supplying fluid under pressure to said brake pipe in releasing the brakes, said additional apparatus comprising a normally charged storage reservoir, a normally charged control reservoir, a valve device normally establishing communication from the brake pipe to said storage reservoir and also establishing communication from the brake pipe to said control reservoir and being subject to control reservoir pressure upon a reduction in brake pipe pressure in effecting an application of the brakes for closing both of said communications, and means operated upon an increase in brake pipe pressure in effecting the release of the brakes for supplying fluid under pressure from the storage reservoir to the brake pipe, said valve device being operated to reestablish said communication when in releasing the brakes the brake pipe pressure is substantially equal to the control reservoir pressure.

19. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, a valve device normally establishing communication from the brake pipe to said storage reservoir and also establishing communication from the brake pipe to said control reservoir and being subject to control reservoir pressure upon a reduction in brake pipe pressure in effecting an application of the brakes for closing communication from the control reservoir to the brake pipe for maintaining fluid under pressure in said control reservoir and for also closing communication from the brake pipe to said storage reservoir, and means operated upon an increase in brake pipe pressure in effecting the release of the brakes for supplying fluid under pressure from the storage reservoir to the brake pipe, said valve device being operated to reestablish both of said communications when in releasing the brakes the brake pipe pressure substantially equals the pressure of fluid maintained in the control reservoir.

20. A fluid pressure brake system for a train of cars comprising a train brake pipe, a fluid pressure brake apparatus on each car of the train operated upon a reduction in brake pipe pressure to effect an application of the brakes and operated upon an increase in brake pipe pressure for effecting the release of the brakes, and an additional apparatus on one car of the train for supplying fluid under pressure to said brake pipe in releasing the brakes, said additional apparatus comprising a normally charged storage reservoir, a normally charged control reservoir, a valve device normally establishing communication from the brake pipe to said storage reservoir and also establishing communication from the brake pipe to said control reservoir and being subject to control reservoir pressure upon a reduction in brake pipe pressure in effecting an application of the brakes for closing both of said communications, means for charging said reservoir with fluid under pressure in excess of that supplied from the brake pipe, means operated upon an increase in brake pipe pressure in releasing the brakes for supplying fluid under pressure from the storage reservoir to the brake pipe, and means operated by fluid under pressure supplied from said reservoir to close communication from the brake pipe to said valve device to prevent the flow of fluid from said brake pipe to the valve device until the pressures of fluid in the storage reservoir and brake pipe equalize, said valve device being operated to reestablish communication between the brake pipe and both of said reservoirs when the brake pipe is substantially charged to the pressure normally carried.

In testimony whereof, I have hereunto set my hand, this 3rd day of February, 1931.

CLYDE C. FARMER.